US008060568B2

(12) United States Patent
Cohen et al.

(10) Patent No.: US 8,060,568 B2
(45) Date of Patent: Nov. 15, 2011

(54) REAL TIME MESSAGING FRAMEWORK HUB TO INTERCEPT AND RETRANSMIT MESSAGES FOR A MESSAGING FACILITY

(75) Inventors: Yaron Cohen, Givatayim (IL); Ofer Feldman, Givat Shmuel (IL)

(73) Assignee: SAP Portal Israel Ltd., Ra'Anana (IL)

( * ) Notice: Subject to any disclaimer, the term of this patent is extended or adjusted under 35 U.S.C. 154(b) by 331 days.

(21) Appl. No.: 11/807,684

(22) Filed: May 29, 2007

(65) Prior Publication Data

US 2008/0301243 A1 Dec. 4, 2008

(51) Int. Cl.
*G06F 15/16* (2006.01)
(52) U.S. Cl. .................. 709/206; 709/219; 709/224
(58) Field of Classification Search .................. None
See application file for complete search history.

(56) References Cited

U.S. PATENT DOCUMENTS

| | | | | |
|---|---|---|---|---|
| 4,247,908 A * | 1/1981 | Lockhart et al. | | 709/245 |
| 5,548,506 A | 8/1996 | Srinivasan | | |
| 6,757,365 B1 * | 6/2004 | Bogard | | 379/88.17 |
| 6,792,431 B2 * | 9/2004 | Tamboli et al. | | 707/102 |
| 6,957,077 B2 * | 10/2005 | Dehlin | | 455/466 |
| 7,009,938 B2 * | 3/2006 | Banerjee et al. | | 370/230 |
| 7,096,255 B2 * | 8/2006 | Malik | | 709/206 |
| 7,444,429 B2 * | 10/2008 | Daniell et al. | | 709/246 |
| 7,761,522 B2 * | 7/2010 | Shenfield et al. | | 709/206 |
| 2001/0003203 A1 * | 6/2001 | Mache | | 713/201 |
| 2002/0007398 A1 * | 1/2002 | Mendiola et al. | | 709/206 |
| 2002/0042830 A1 * | 4/2002 | Bose et al. | | 709/230 |
| 2002/0118809 A1 * | 8/2002 | Eisenberg | | 379/202.01 |
| 2002/0130904 A1 * | 9/2002 | Becker et al. | | 345/753 |
| 2002/0155826 A1 * | 10/2002 | Robinson et al. | | 455/412 |
| 2002/0181571 A1 * | 12/2002 | Yamano et al. | | 375/222 |
| 2002/0198949 A1 * | 12/2002 | Maehiro | | 709/206 |
| 2003/0087632 A1 * | 5/2003 | Sagi et al. | | 455/414 |
| 2004/0006711 A1 * | 1/2004 | Krishnaswamy et al. | | 713/201 |
| 2004/0152477 A1 * | 8/2004 | Wu et al. | | 455/466 |
| 2004/0204068 A1 * | 10/2004 | Komaki | | 455/556.1 |
| 2004/0267942 A1 * | 12/2004 | Maes | | 709/228 |
| 2005/0009541 A1 * | 1/2005 | Ye et al. | | 455/466 |
| 2005/0044144 A1 * | 2/2005 | Malik et al. | | 709/205 |
| 2005/0114533 A1 * | 5/2005 | Hullfish et al. | | 709/230 |

(Continued)

OTHER PUBLICATIONS

"Microsoft Windows Forms QuickStart Tutorial", (2002), download Mar. 12, 2008, http://samples.gotdotnet.com/quickstart/winforms/doc/default.aspx, 2pgs.

(Continued)

*Primary Examiner* — Ian N Moore
*Assistant Examiner* — Dung B Huynh
(74) *Attorney, Agent, or Firm* — Buckley, Maschoff & Talwalkar LLC

(57) ABSTRACT

Methods and systems are provided for communicating an event from a server to a set of applications via a real time messaging framework hub, which communicates with the applications on individual channels and with the server on a single channel. A polling message is sent to the server and a reply is received. From the reply, it is determined whether the event has occurred. A polling message is received from a client, and a reply is sent containing either the event, if it has occurred, or a null response is sent indicating that the event has not occurred. Limitation of server communication with the hub to a single open channel substantially reduces server overhead.

29 Claims, 8 Drawing Sheets

U.S. PATENT DOCUMENTS

| | | | |
|---|---|---|---|
| 2005/0165913 A1* | 7/2005 | Coulombe et al. | 709/219 |
| 2005/0210394 A1* | 9/2005 | Crandall et al. | 715/752 |
| 2006/0075351 A1* | 4/2006 | Brumfield | 715/753 |
| 2006/0116139 A1* | 6/2006 | Appelman | 455/466 |
| 2007/0067780 A1* | 3/2007 | Kumar et al. | 719/318 |
| 2007/0224978 A1* | 9/2007 | Wherry et al. | 455/414.2 |
| 2007/0288560 A1* | 12/2007 | Bou-Ghannam et al. | 709/204 |
| 2008/0147834 A1* | 6/2008 | Quinn et al. | 709/223 |

OTHER PUBLICATIONS

"New on Java Boutique", (2006), download Jun. 25, 2006, http://javaboutique.internet.com, 4pgs.

* cited by examiner

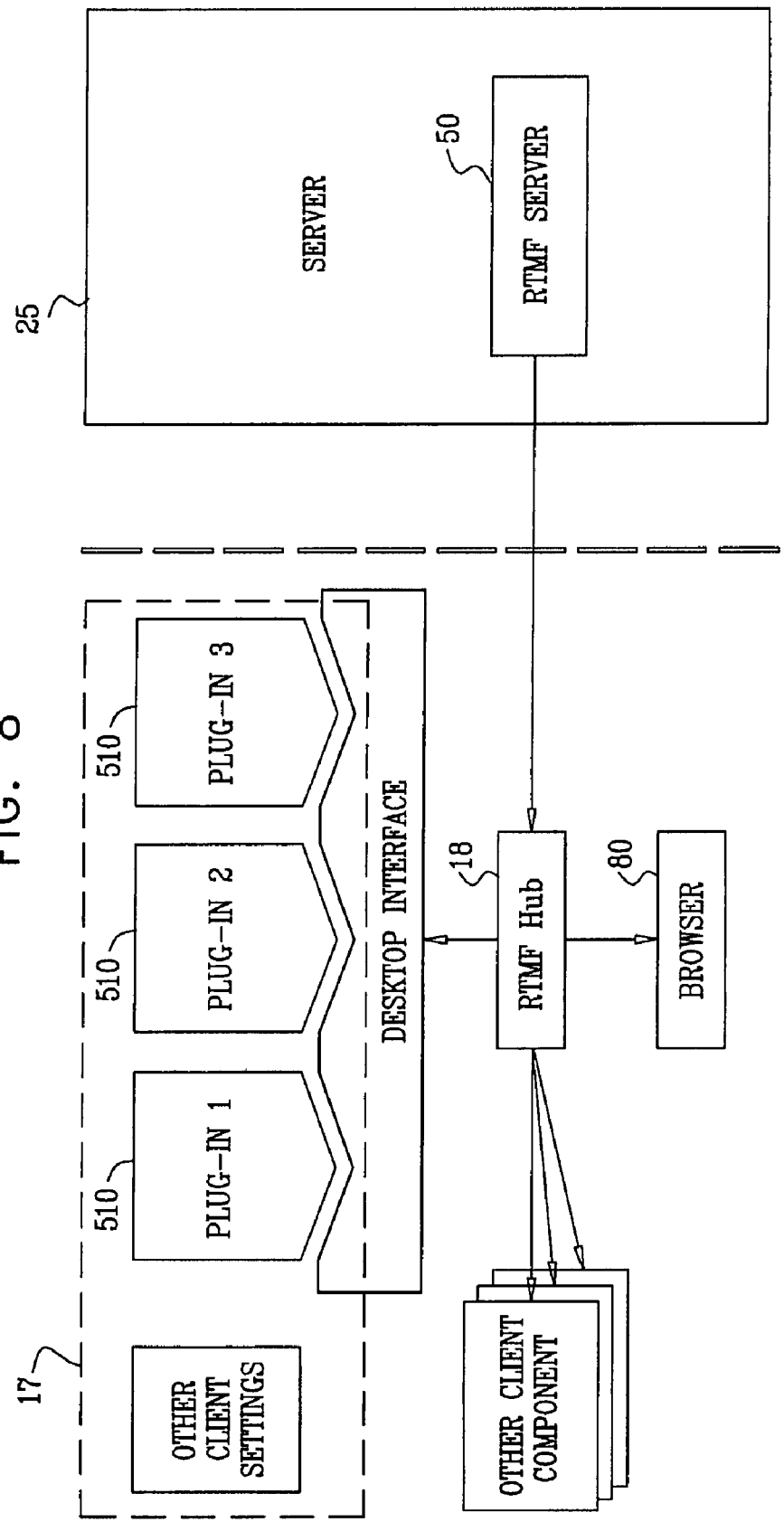

REAL TIME MESSAGING FRAMEWORK HUB TO INTERCEPT AND RETRANSMIT MESSAGES FOR A MESSAGING FACILITY

BACKGROUND OF THE INVENTION

1. Field of the Invention

This invention relates to computer network protocols. More particularly, this invention relates to a real time messaging framework for use in a communications network.

2. Description of the Related Art

Real Time Messaging Framework (RTMF) is an instant messaging system that is available from SAP AG, Neurottstraße 16, 69190 Waldorf, Germany. This is an infrastructure for transferring messages between clients and servers in an application platform. Typically, clients are connected to a RTMF server through a RTMF client running in a hidden frame in their portal browsers. In one aspect of RTMF, every RTMF-based client sends an automated request to a RTMF server every number of seconds to check if messages, events, requests, or invitations have been sent to it. The time between each check is commonly referred to as the polling interval. The polling mechanism, if not configured properly, has the potential to generate load on the portal server as the number of users increases.

SUMMARY OF THE INVENTION

For security reasons, data networks such as the Internet impose certain limitations on server-client interactions. For example, a server may not be able to initiate contact with a client, unless the client first sends a request to the server. One method by which the client can be notified about a particular class of event that takes place on, or is known to, the server, is to use a polling mechanism. At frequent intervals, the client sends a message to the server, asking if an event of the class has occurred. The server replies with a message indicating either that no event in the class has occurred, or which contains details of the events that have occurred.

Real Time Messaging Framework (RTMF) provides a structure for the messages described above. It works over a HTTP/HTTPS (Hypertext Transfer Protocol/Hypertext Transfer Protocol Secure) environment. However, the principles of this invention can also be applied to other similar connectivity environments.

A messaging framework such as that described above has many applications. For example, it can be used for instant messaging. User messages are sent from one user to another user via a server, where the user messages are stored. Each user polls the server for an event, i.e., the arrival of a user message destined for that user. The polling reply contains the user message.

As the number of clients polling a server increases, the load on the server increases and can become excessive. One method of reducing the load is to increase the polling interval. However, as the polling interval increases, the delay between the occurrence of an event and the notification to the client can become excessive, to the point that the messaging system can no longer be considered "real time".

According to disclosed embodiments of the invention, a RTMF hub on one computing device replaces individual server notification channels of different clients on the same or different devices and combines them into one hub-controlled channel. The hub services one or more clients, polls the server on behalf of its clients and stores the events from the server relevant to its respective clients. The clients then transparently poll the hub, in the same way that they would poll the server. This eliminates most of the polling messages that would conventionally be required. In consequence, network traffic between the client and the server is greatly reduced.

In one aspect of the invention, an abstraction of the notification channel is created, which replaces the conventional channels used by the server to pass messages to clients, and which passes messages transparently to the different clients that use the channel. In another aspect of the invention, a platform controls message flow between the different clients and servers according to a particular logical schema, such as business logic. For example, the platform may block specific message categories when the message traffic load exceeds a predefined threshold.

An embodiment of the invention provides a computer-implemented method of communication via a communications network, which is carried out by executing a set of applications in a computing device, wherein the applications exchange messages with a server. The server has a real time messaging facility operative for processing the messages, registering the applications with a hub, intercepting the messages in the hub, and retransmitting the messages from the hub. The method is further carried out by communicating the messages between the hub and the registered applications via respective first channels, and the messages are communicated between the hub and the real time messaging facility via only one second channel.

According to an aspect of the method, the set of applications includes at least two different application types that are selected from the group consisting of instant messaging applications, telephony applications, and short messaging service applications.

One aspect of the method includes varying intercepting and retransmitting the messages according to a governing schema. The schema may comprise blocking predetermined categories of the messages when a traffic load exceeds a predetermined threshold.

One aspect of the method includes executing a graphical desktop interface in the computing device for coordination of the applications executing therein, wherein the messages are communicated between the applications and the hub via the graphical desktop interface.

According to another aspect of the method, the messages comprise polling requests from the applications to the server and polling replies from the server to the applications.

Yet another aspect of the method includes respectively associating a class of events with the registered applications, wherein the polling requests comprise inquiries whether at least one event of the class has occurred.

According to a further aspect of the method, the polling replies comprise a null polling reply that is sent when the at least one event has not occurred and an identification of the at least one event that is sent when the at least one event has occurred.

An embodiment of the invention provides a real time messaging framework hub, including a communication interface for communicating messages with a server and a client and a processor, which is configured to intercept messages that are exchanged between a set of applications that are registered with the hub and execute in the client and the server for service thereof using a real time messaging facility, and to retransmit the messages. The messages are communicated between the hub and the registered applications via respective first channels, and the messages are communicated between the hub and the real time messaging facility via only one second channel.

Other embodiments of the invention provide computer software product for carrying out the above-described method.

One embodiment provides a computer software product for communication via a communications network, including a tangible computer-readable medium in which computer program instructions are stored, which instructions, when read by a computer, cause the computer to intercept messages exchanged between a set of applications and a server for service thereof via a real time messaging facility executing in said server, said applications executing in a client, to register said applications with said server, and to retransmit said messages, wherein said messages are communicated between said computer and said registered applications via respective first channels, and said messages are communicated between said computer and said real time messaging facility via only one second channel.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 8 is a pictorial diagram illustrating the functionality of a graphical desktop interface, which interacts with a RTMF hub, in accordance with a disclosed embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a non-transitory, tangible readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Figure 1:
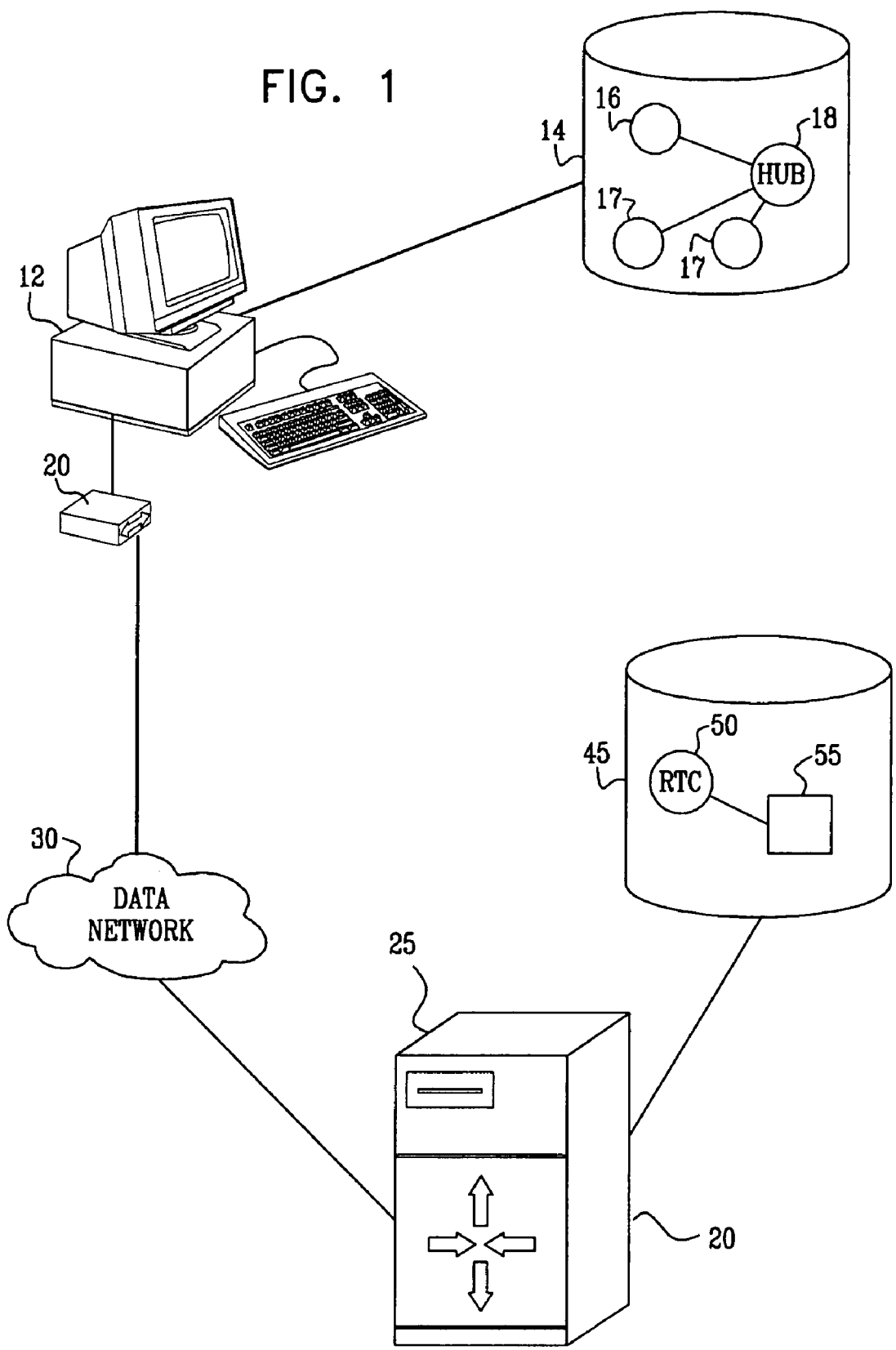
FIG. 1 is a pictorial diagram of an exemplary data processing system in which the invention may be implemented.

Turning now to the drawings, reference is initially made to FIG. 1, which is a pictorial diagram of an exemplary data processing system 10 in which the invention may be implemented. System 10 comprises a general purpose computer 12, which is provided with a memory 14 for storage of executables and data. Memory 14 is typically realized as a hard disk. Alternatively, other known types of memory may be used alone or in combination with the hard disk as memory 14. Memory 14 stores applications, including RTMF clients 16, for example one or more graphical desktop interfaces 17. Memory 14 also stores a RTMF hub 18.

Computer 12 is provided with a communication interface 20, such as a network card, which may use any known networking technique, including wireless links, optical networks, etc. Communication interface 20 is linked to a server 25 via a data network 30 and another communication interface 20.

Server 25 is provided with a memory 45, which can be of any of the forms described above for memory 14. Memory 45 stores a RTMF server 50, for example RTC (Real Time Collaboration), produced by SAP AG. Memory 45 also stores a resource 55, for example a web page.

RTMF Hub.

Figure 2:
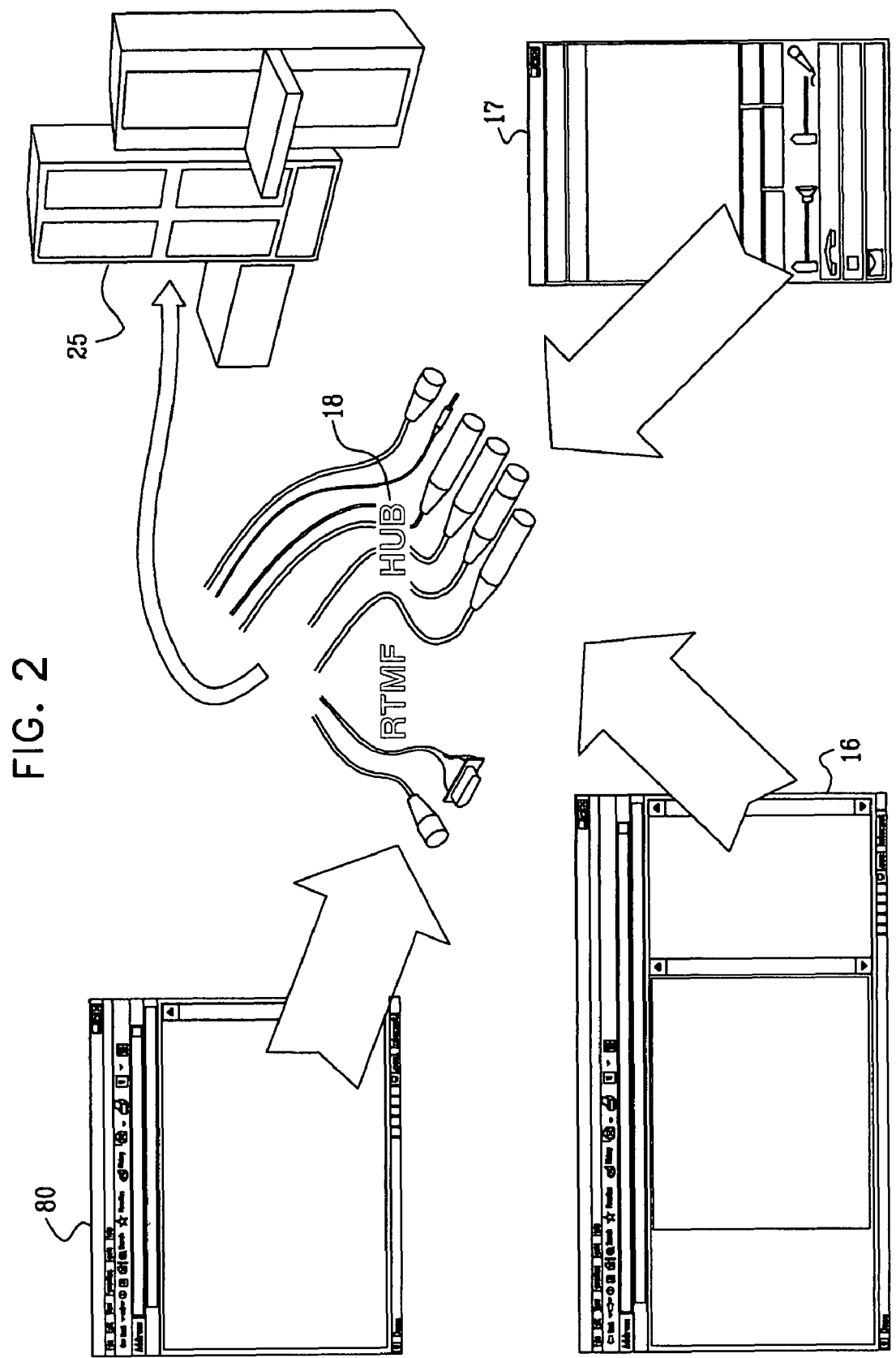
FIG. 2 is a pictorial diagram of an aspect of the data processing system of FIG. 1.

Reference is now made to FIG. 2, which is a pictorial diagram of a part of the data processing system of FIG. 1. RTMF hub 18 provides a single point of connection for each RTMF client to server 25, which includes RTMF server 50 (FIG. 1). RTMF clients shown in FIG. 2 include, in addition to one of the clients 16, the graphical desktop interfaces 17 and a web browser 80.

Alternate Embodiment

Figure 3:
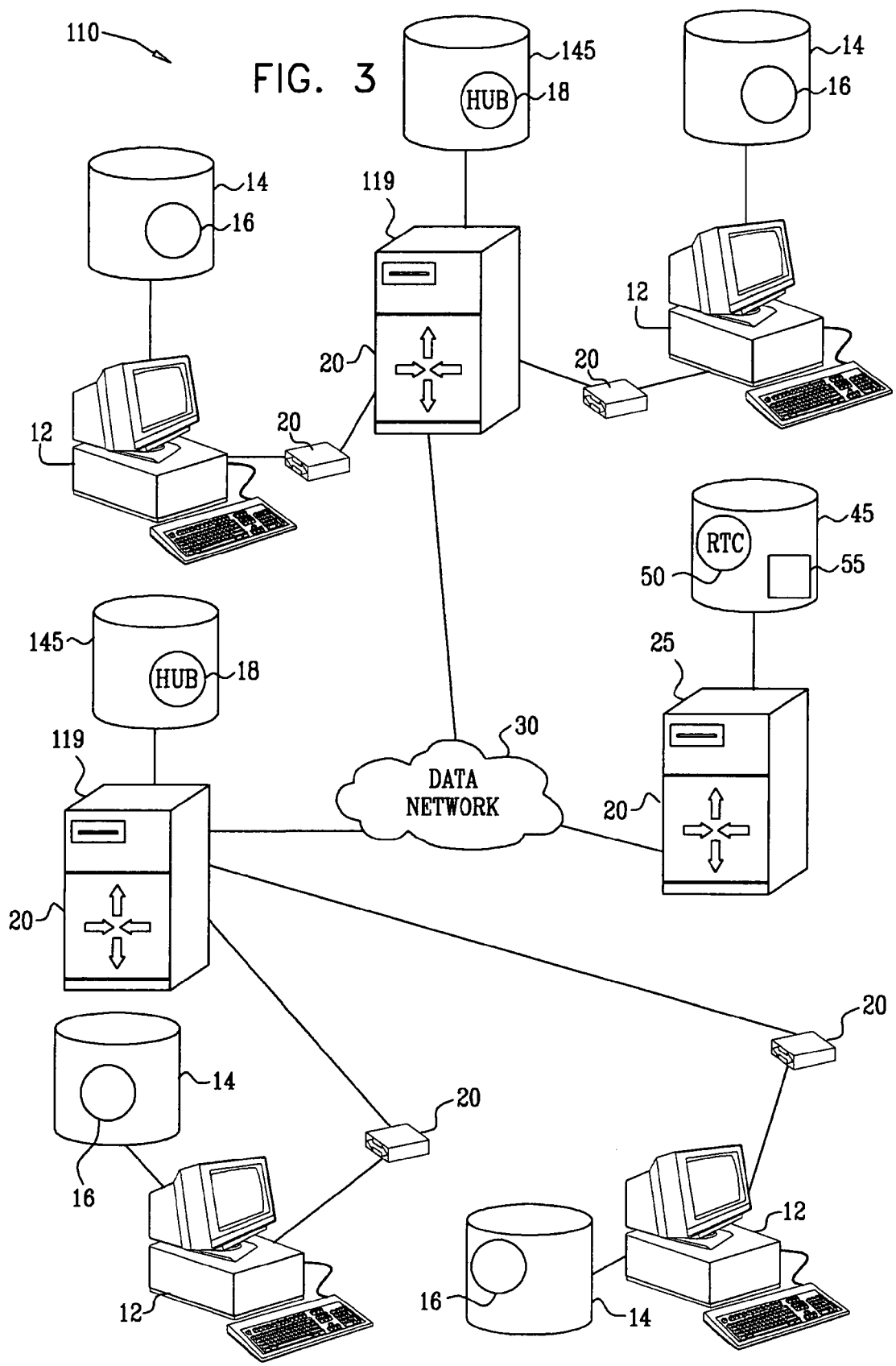
FIG. 3 is a pictorial diagram of an alternative embodiment of a data processing system in which the invention may be implemented.

Reference is now made to FIG. 3, which is a pictorial diagram of an alternative embodiment of a data processing system 110 in which the invention may be implemented. System 110 comprises any number of general purpose computers 12 (four are shown in FIG. 2), similar to computers 12 of system 10 (FIG. 1).

Any number of computers 119 (two are shown in FIG. 2) are connected to computers 12 via connection interfaces 20. Each computer 119 is provided with a memory 145, which can be of any of the forms described above for memory 14. Memory 145 stores RTMF hub 18. Computer 119 is sometimes referred to as a RTMF box.

Each computer 12 is logically connected to one RTMF box 119. The connections between the communication devices of computers 12 and RTMF boxes 119 are shown in FIG. 2 as direct connections, in order to illustrate the logical connections more clearly. However, the connections may actually be via network 30, or via any other network similar to network 30.

Figure 4:
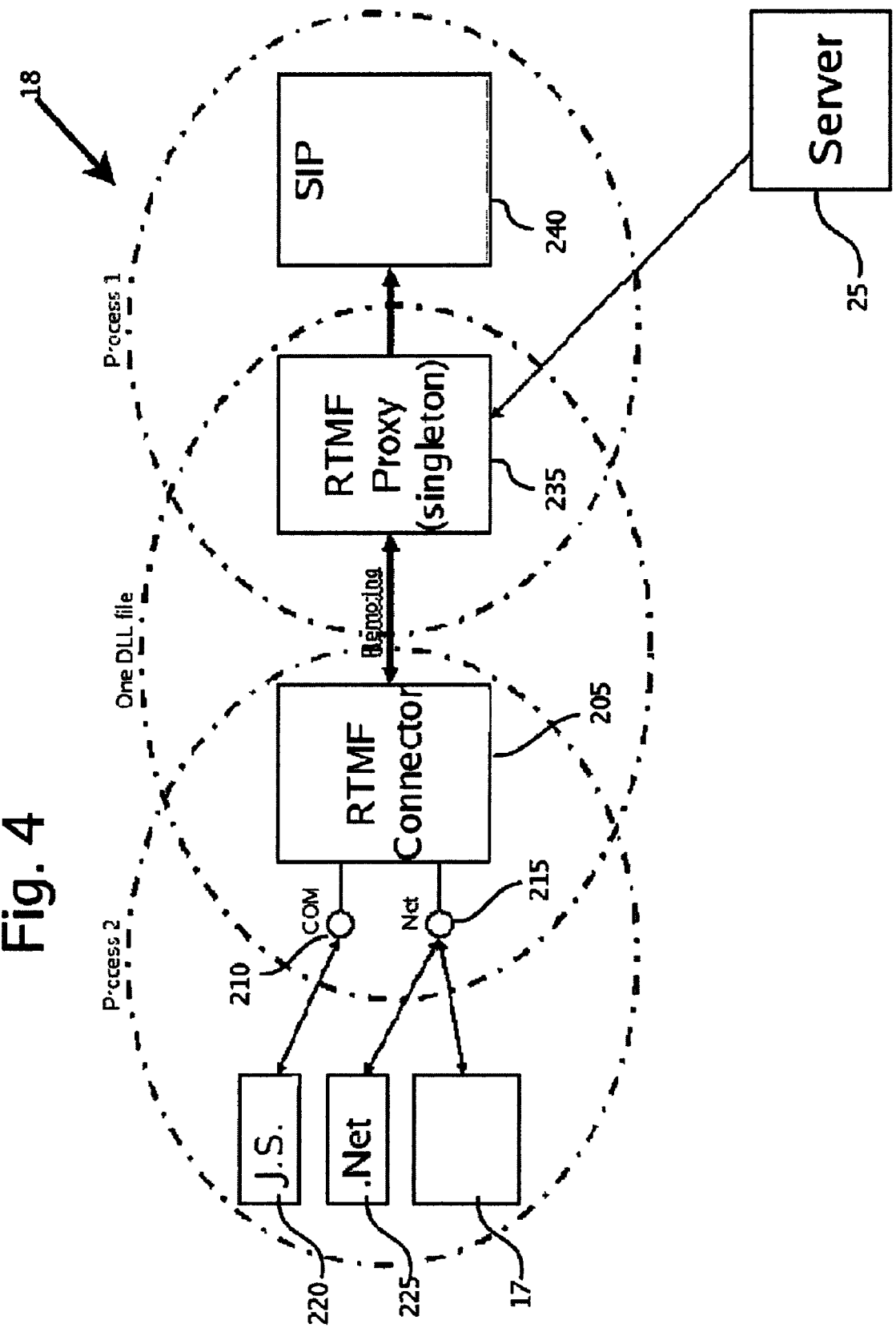
FIG. 4 is a detailed block diagram of a RTMF hub, in accordance with a disclosed embodiment of the invention.

Reference is now made to FIG. 4, which is a detailed block diagram of RTMF hub 18, in accordance with a disclosed embodiment of the invention. RTMF hub 18 provides a RTMF connector 205. RTMF connector 205 provides two Application Programming Interfaces (APIs), a COM API 210 and a .NET™ API 215. COM API 210 provides an interface for a JavaScript application 220. The .NET API 215 provides an interface for .NET application 225. Graphical desktop interfaces 17 may use .NET API 215 or COM API 210.

In some embodiments, RTMF connector 205 interfaces to a RTMF proxy 235 using HTTP/HTTPS. In other embodiments, communication between RTMF connector 205 and RTMF proxy 235 uses a named pipe. RTMF connector 205 and RTMF proxy 235 may be on the same computer, as in the embodiment of FIG. 1, or on different computers, as in the embodiment of FIG. 2. RTMF proxy 235 is described in further detail hereinbelow.

In some embodiments, RTMF proxy 235 communicates with a SIP module 240. SIP module 240 handles Session Initiation Protocol (SIP), which is well-known in the art.

RTMF proxy 235 also communicates with server 25, which contains RTMF server 50 (FIG. 1).

Figure 5:
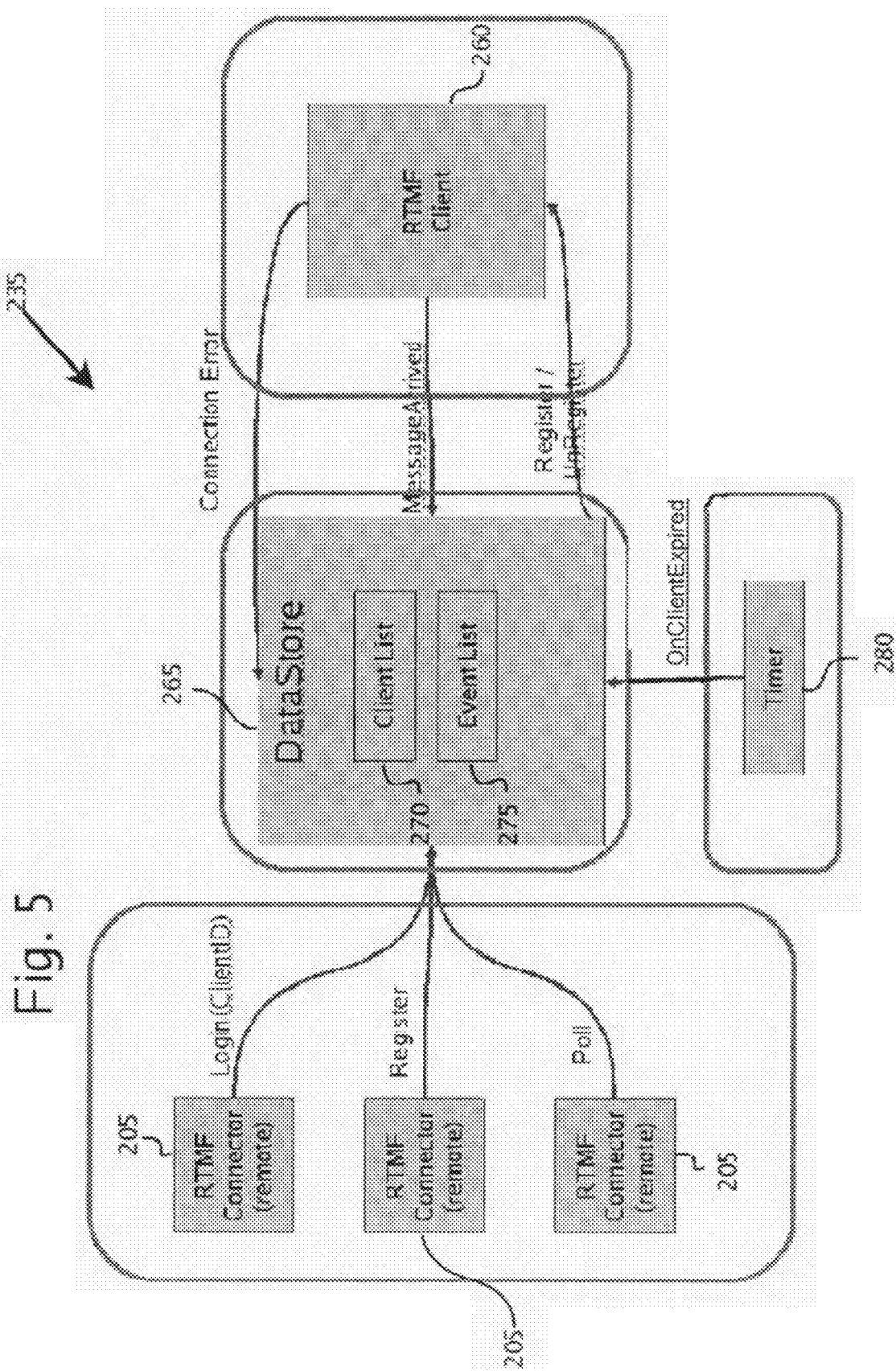
FIG. 5 is a detailed block diagram of the RTMF proxy of FIG. 4.

Reference is now made to FIG. 5, which is a detailed block diagram of RTMF proxy 235 (FIG. 4). A RTMF client 260 exists in a separate thread, and is in charge of a connection with RTMF server 50 (FIG. 1).

A data store 265 holds a client list 270 and an event list 275. Client list 270 is a list of clients that are currently registered with the proxy. Event list 275 is a list of events for which the clients in client list 270 are currently registered. Data store 265 also holds a list of new events received from RTMF server 50 (FIG. 1).

The data in data store 265 is synchronized, to ensure that one thread does not modify it while another thread is reading it. Methods for ensuring that data is synchronized between different threads are well known in the art, and are not discussed further here.

A timer 280 exists in a separate thread and is in charge of removing clients from client list 270 if they stop polling RTMF proxy 235.

Operation.

By way of example, two RTMF clients 16 (FIG. 1), referred to hereinbelow as RTMF client A and RTMF client B, with the same user credentials, wish to be notified about any changes to resource 55. RTMF client A may be on the same computer 12 as RTMF client B, as in FIG. 1, or on a separate computer 119 as in FIG. 3.

Figure 6:
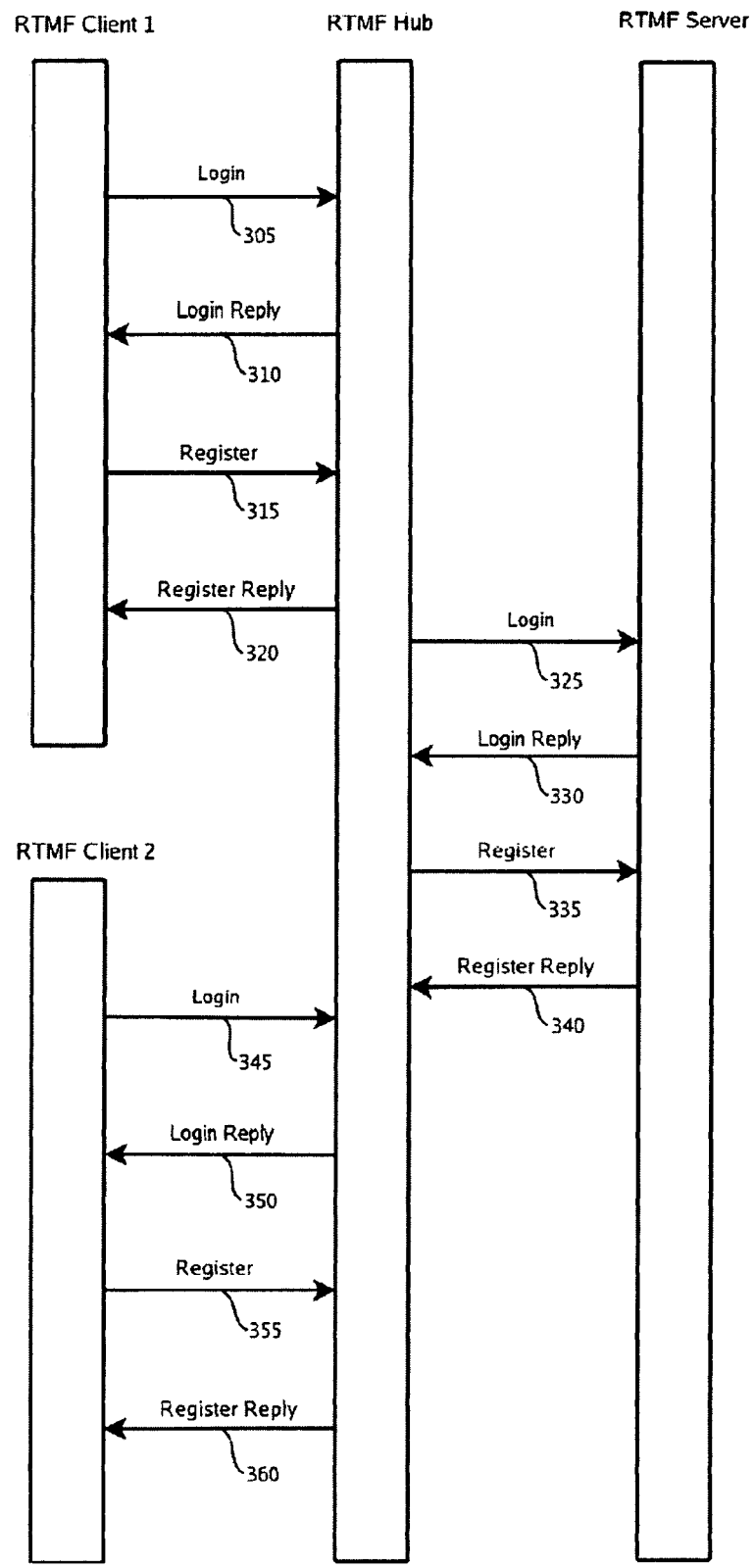
FIG. 6 is a sequence diagram showing registration for RTMF events, in accordance with a disclosed embodiment of the invention.

Reference is now made to FIG. 6, which is a sequence diagram showing registration for RTMF events, in accordance with a disclosed embodiment of the invention. At initial step 305, RTMF client A sends a login request to RTMF hub 18 (FIG. 1). In some embodiments, RTMF hub 18 vets the login details. In other embodiments, RTMF hub 18 merely checks whether a login request for this user has already been sent. Referring again to FIG. 5, details of RTMF client A are stored in client list 270.

Referring again to FIG. 6, at step 310, RTMF hub 18 sends a reply to RTMF client A for the login request.

At step 315, RTMF client A sends a message to RTMF hub 18 to register for a specific event i.e., changes to resource 55. Details of the event registered are stored in event list 275 (FIG. 5).

Next, at step 320, RTMF hub 18 sends a reply to RTMF client A for the message to register for an event.

At step 325, RTMF client 260 (FIG. 5) passes the login request to RTMF server 50 (FIG. 1). In some embodiments this step takes place before step 315.

Next at step 330, RTMF server 50 replies to the login request.

At step 335, RTMF client 260 sends a message to register for an event to RTMF server 50.

Next at step 340, RTMF server 50 replies to the message to register for an event.

At step 345, RTMF client B sends a login request to RTMF hub 18 (FIG. 1). RTMF hub 18 observes that the user credentials for RTMF client B are already stored in client list 270. Therefore, a second login request is not sent to RTMF server 50.

Next, at step 350, RTMF hub 18 sends a reply to RTMF client B for the login request.

At step 355, RTMF client B sends a message to RTMF hub 18 to register for a specific event i.e., changes to resource 55. Since this event is already stored in event list 275, RTMF client 260 does not send a second message to register for the event to RTMF server 50.

Next, at step 360, RTMF hub 18 sends a reply to RTMF client B for the message to register for an event.

Figure 7:
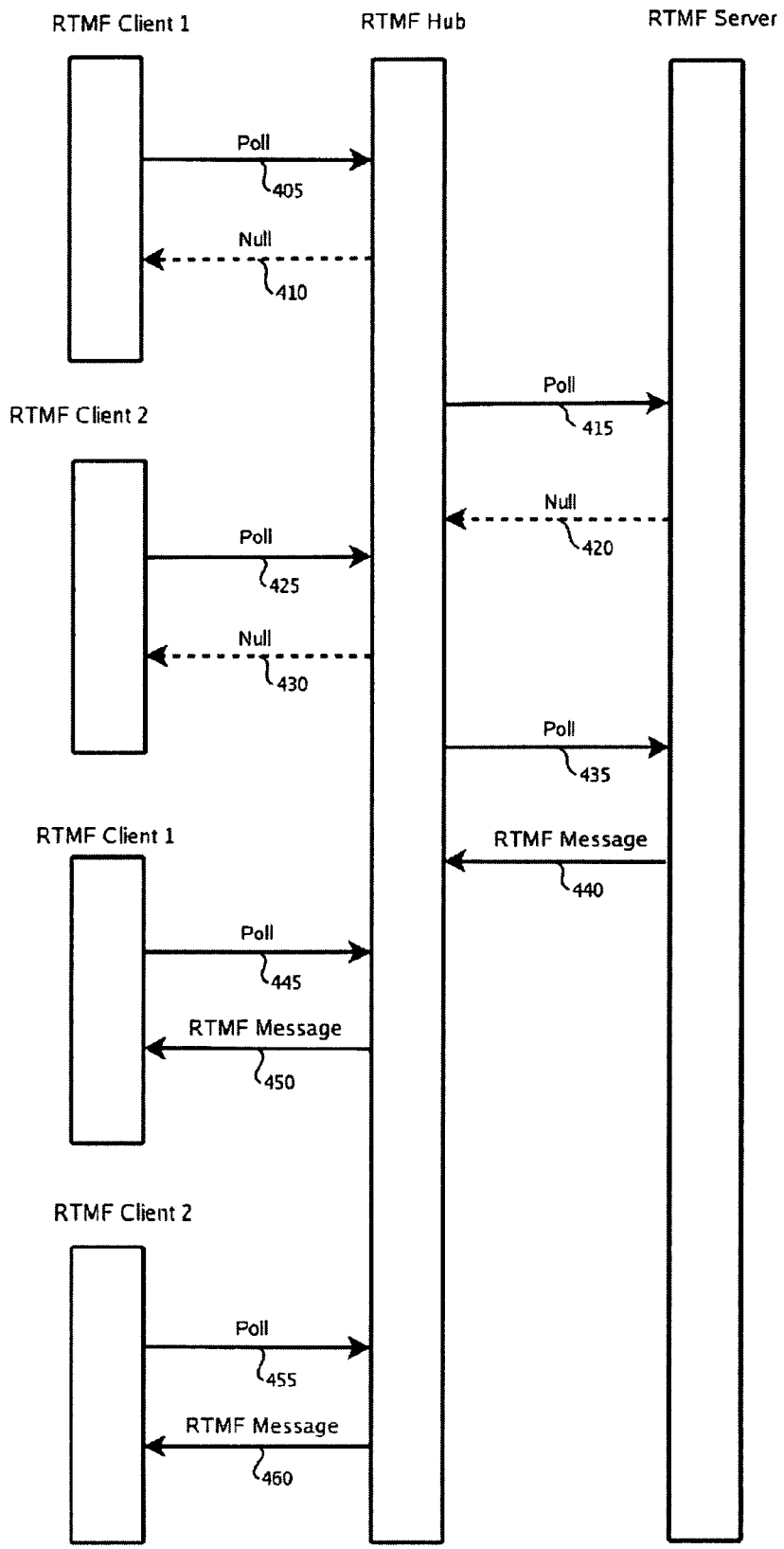
FIG. 7 is a sequence diagram showing polling for RTMF events, in accordance with a disclosed embodiment of the invention.

Reference is now made to FIG. 7, which is a message diagram showing polling for RTMF events, in accordance with a disclosed embodiment of the invention. At initial step 405, RTMF client A sends a polling message to RTMF hub 18 (FIG. 1), inquiring if there have been any changes to resource 55 since the last poll request (or since RTMF client A registered for this event). RTMF client A sends polling messages periodically.

Next, at step 410, RTMF hub 18 sends a null polling reply to RTMF client A indicating that there are no events.

At step 415, RTMF hub 18 sends a polling message to RTMF server 50 (FIG. 1), inquiring if there have been any changes to resource 55 since the last poll request (or since RTMF hub 18 registered for this event). RTMF hub 18 sends these polling messages periodically, at a rate that is typically unrelated to the rate at which RTMF clients poll RTMF hub 18.

Next, at step 420, RTMF server 50 sends a null polling reply to RTMF hub 18 indicating that there are no events.

At step 425, RTMF client B sends a polling message to RTMF hub 18 (FIG. 1), inquiring if there have been any changes to resource 55 since the last poll request (or since RTMF client B registered for this event). RTMF client B sends these polling messages periodically.

Next, at step 430, RTMF hub 18 sends a null polling reply to RTMF client B indicating that there are no events.

At step 435, RTMF hub 18 sends a polling message to RTMF server 50, inquiring if there have been any changes to resource 55 since the last poll request. In the scenario shown in FIG. 7, an event has occurred between steps 415 and 435.

Next, at step 440, RTMF server 50 sends a reply to RTMF hub 18. The reply is a RTMF message containing details of the event. The reply is received by RTMF client 260 (FIG. 5) and stored in data store 265. If two or more events have occurred since the last polling request, details of these requests are contained in the reply, and they are all stored in data store 265.

At step 445, RTMF client A sends a polling message to RTMF hub 18 (FIG. 1), inquiring if there have been any changes to resource 55 since the last poll request.

Next, at step 450, RTMF hub 18 sends a reply, containing the event from data store 265, to RTMF client A. If there are two or more relevant events in data store 265, they are sent to RTMF client A in a single reply.

At step 455, RTMF client B sends a polling message to RTMF hub 18 (FIG. 1), inquiring if there have been any changes to resource 55 since the last poll request.

Next, at final step 460, RTMF hub 18 sends a reply, containing the event from data store 265, to RTMF client B.

Graphical Desktop Interface.

Reference is now made to FIG. 8, which is a pictorial diagram illustrating the functionality of a typical graphical desktop interface 17 (FIG. 1), which interacts with RTMF hub 18 (FIG. 1), in accordance with a disclosed embodiment of the invention. A suitable graphical desktop interface, in cooperation with RTMF hub 18, brings together different aspects of daily work into one tool, e.g., collaboration, alerts, work list and decision support. Graphical desktop interface 17 enables a user to communicate with others using varied communication channels, e.g., instant messaging, telephony, short messaging service (SMS), and provides a context relevant to business environment of the user.

Graphical desktop interface 17 comprises a number of plug-ins 510, each of which performs one or more of the tasks described above.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method of communication via a communications network, comprising the steps of:
   executing a set of applications in a first computing device associated with a first user;
   executing at least one application in a second computing device associated with a second user and remote from the first computing device, wherein all of said applications exchange messages via a first protocol with a single server remote from the first and second computing devices, said server having a real time messaging facility for processing said messages in accordance with the first protocol to communicate information between the first and second user via the messages;
   registering said applications with a hub;
   intercepting said messages in said hub;
   retransmitting said messages from said hub, wherein said messages are communicated between said hub and said registered applications via a plurality of respective first channels, and said messages are communicated between said hub and said real time messaging facility via a single second channel;
   sending a message from an application of the set of applications in the first computing device to said hub to register for a specific event;
   storing details of the specific event in an event list;
   sending a message from the hub to the server to register for the specific event;
   sending a message from an application of the at least one application in the second computing device to said hub to register for the specific event;
   determining not to send a message from hub to the server to register for the specific event in response to the message from the application in the second computing device to register for the specific event, because the details of the specific event are already stored in the event list as a result of the message from the application in the first computing device to register for the specific event;
   sending a polling message from the application of the set of applications in the first computing device to the hub to inquire whether the specific event has occurred;
   sending a null polling reply from the hub to the application of the set of applications in the first computing device to indicate that the specific event has not occurred;
   sending a polling message from the application of the at least one application in the second computing device to the hub to inquire whether the specific event has occurred;
   sending a null polling reply from the hub to the application of the at least one application in the second computing device to indicate that the specific event has not occurred;
   sending a polling message from the hub to the server to inquire whether the specific event has occurred;
   sending a reply from the server to the hub indicating that the specific event has occurred;
   storing the reply from the server indicating that the specific event has occurred in a data store;
   sending a polling message from the application of the set of applications in the first computing device to the hub to inquire whether the specific event has occurred;
   sending a reply from the hub to the application of the set of applications in the first computing device to indicate that the specific event has occurred, the reply containing details that were contained in the reply from the server indicating that the specific event has occurred;
   sending a message from the application of the at least one application in the second computing device to the hub to inquire whether the specific event has occurred; and
   sending a reply from the hub to the application of the at least one application in the second computing device to indicate that the specific event has occurred, the reply containing details that were contained in the reply from the server indicating that the specific event has occurred.

2. The method according to claim 1 further comprising the step of executing a graphical desktop interface in said first computing device for coordination of said applications executing therein, wherein said messages are communicated between said applications and said hub via said graphical desktop interface.

3. The method according to claim 1, wherein said set of applications comprises applications of a first type and further wherein at least one of said first and second devices also executes applications of a second type, different than the first type, and said hub also intercepts and retransmits messages for the additional applications.

4. The method according to claim 3, wherein the first type of applications are instant messaging applications and the second type of applications are either telephone applications or short messaging service applications.

5. The method according to claim 1, further comprising varying said steps of intercepting and retransmitting said messages according to a governing schema.

6. The method according to claim 5, wherein said schema comprises blocking predetermined categories of said messages when a traffic load exceeds a predetermined threshold.

7. The method according to claim 1, wherein said messages comprise polling requests from said applications to said server and polling replies from said server to said applications.

8. The method according to claim 7, further comprising the step of respectively associating a class of events with said registered applications, wherein said polling requests comprise inquiries whether at least one event of said class has occurred.

9. The method according to claim 8, wherein said polling replies comprise a null polling reply that is sent when said at least one event has not occurred and an identification of said at least one event that is sent when said at least one event has occurred.

10. A non-transitory, tangible computer-readable medium in which computer program instructions are stored, which instructions, when read by a computer, cause the computer to:
   intercept messages exchanged between a server and a set of applications executing at a first computing device associated with a first user,
   intercept messages exchanged between the server and at least one application executing at a second computing device associated with a second user, wherein all of said applications exchange messages via a first protocol, and the server has a real time messaging facility for processing said messages in accordance with the first protocol to communicate information between the first and second user via the messages, register said set of applications and said at least one application with said server, retransmit said messages, wherein said messages are communicated between said applications registered with said server and said computer via a plurality of respective first channels, and said messages are communicated between said computer and said real time messaging facility via a single second channel;

receive a message from an application of the set of applications executing at the first computing device to register for a specific event, store details of the specific event in an event list;

send a message to the server to register for the specific event;

receive a message from an application of the at least one application executing at the second computing device to register for the specific event, determine not to send a message to the server to register for the specific event in response to the message from the application executing at the second computing device to register for the specific event, because the details of the specific event are already stored in the event list as a result of the message from the application executing at the first computing device to register for the specific event;

send a polling message from the application of the set of applications in the first computing device to the hub to inquire whether the specific event has occurred;

send a null polling reply from the hub to the application of the set of applications in the first computing device to indicate that the specific event has not occurred;

send a polling message from the application of the at least one application in the second computing device to the hub to inquire whether the specific event has occurred;

send a null polling reply from the hub to the application of the at least one application in the second computing device to indicate that the specific event has not occurred;

send a polling message from the hub to the server to inquire whether the specific event has occurred;

send a reply from the server to the hub indicating that the specific event has occurred;

store the reply from the server indicating that the specific event has occurred in a data store;

send a polling message from the application of the set of applications in the first computing device to the hub to inquire whether the specific event has occurred;

send a reply from the hub to the application of the set of applications in the first computing device to indicate that the specific event has occurred, the reply containing details that were contained in the reply from the server indicating that the specific event has occurred;

send a message from the application of the at least one application in the second computing device to the hub to inquire whether the specific event has occurred; and send a reply from the hub to the application of the at least one application in the second computing device to indicate that the specific event has occurred, the reply containing details that were contained in the reply from the server indicating that the specific event has occurred.

11. The computer-readable medium of claim 10, wherein said set of applications comprises applications of a first type and further wherein at least one of said first and second devices also executes applications of a second type, different than the first type, and said hub also intercepts and retransmits messages for the additional applications.

12. The computer-readable medium of claim 11, wherein the first type of applications are instant messaging applications and the second type of applications are either telephone applications or short messaging service applications.

13. The computer-readable medium of claim 10, wherein said computer is further instructed to intercept and retransmit said messages according to a governing schema.

14. The computer-readable medium of claim 13, wherein said schema comprises blocking predetermined categories of said messages when a traffic load exceeds a predetermined threshold.

15. The computer-readable medium of claim 10 wherein said first computing device is instructed to execute a graphical desktop interface for coordination of said set of applications executing therein, wherein said messages are communicated between said set of applications and said computer via said graphical desktop interface.

16. The computer-readable medium of claim 10, wherein said messages comprise polling requests from said applications registered with said server to said server and polling replies from said server to said applications registered with said server.

17. The computer-readable medium of claim 16, wherein said computer is further instructed to associate a class of events with said applications registered with said server, wherein said polling requests comprise inquiries whether at least one event of said class has occurred.

18. The computer-readable medium of claim 17, wherein said polling replies comprise a null polling reply that is sent when said at least one event has not occurred and an identification of said at least one event that is sent when said at least one event has occurred.

19. A real time messaging framework hub, comprising:

a communication interface for communicating messages with (i) a server, (ii) a first computing device associated with a first user, and (iii) a second computing device associated with a second user; and a processor, which is configured to:

intercept messages that are exchanged between a set of applications that are registered with said hub and executing in said first and second computing devices, wherein all of said applications exchange messages via a first protocol, wherein the server has a real time messaging facility to process said messages in accordance with the first protocol to communicate information between the first and second users via the messages, wherein said registered set of applications include an application that is executing in the first computing device and an application that is executing in the second computing device, retransmit said messages, wherein said messages are communicated between said hub and said registered set of applications via a plurality of respective first channels, and said messages are communicated between said hub and said real time messaging facility via a single second channel;

receive a message from the application that is executing at the first computing device to register for a specific event, store details of the specific event in an event list;

send a message to the server to register for the specific event;

receive a message from the application that is executing at the second computing device to register for the specific event, determine not to send a message to the server to register for the specific event in response to the message from the application that is executing at the second computing device, because the details of the specific event are already stored in the event list as a result of the message from the application that is executing at the first computing device to register for a specific event, send a polling message from the application of the set of applications in the first computing device to the hub to inquire whether the specific event has occurred, send a null polling reply from the hub to the application of the set of applications in the first computing device to indicate that the specific event has not occurred, send a polling message from the application of the at least one application in the second computing device to the hub to inquire whether the specific event has occurred, send a null polling reply from the hub to the application of the at least one application in the second computing device to indicate that the specific event has not occurred, send a polling message from the hub to the server to inquire whether the specific event has occurred, send a reply from the server to the hub indicating that the specific event has occurred, store the reply from the server indicating that the specific event has occurred in a data store, send a polling message from the application of the set of applications in the first computing device to the hub to inquire whether the specific event has occurred, send a reply from the hub to the application of the set of applications in the first computing device to indicate that the specific event has occurred, the reply containing details that were contained in the reply from the server indicating that the specific event has occurred, send a message from the application of the at least one application in the second computing device to the hub to inquire whether the specific event has occurred, and send a reply from the hub to the application of the at least one application in the second computing device to indicate that the specific event has occurred, the reply containing details that were contained in the reply from the server indicating that the specific event has occurred.

20. The real time messaging framework hub according to claim 19, wherein said set of applications comprises applications of a first type and further wherein at least one of said first and second devices also executes applications of a second type, different than the first type, and said hub also intercepts and retransmits messages for the additional applications, and further wherein the first type of applications are instant messaging applications and the second type of applications are either telephone applications or short messaging service applications.

21. The real time messaging framework hub according to claim 19, wherein said messages comprise polling requests from said set of applications to said server and polling replies from said server to said set of applications.

22. The real time messaging framework hub according to claim 21, wherein said processor is further instructed to associate a class of events with said registered set of applications, wherein said polling requests comprise inquiries whether at least one event of said class has occurred.

23. The real time messaging framework hub according to claim 22, wherein said polling replies comprise a null polling reply that is sent when said at least one event has not occurred and an identification of said at least one event that is sent when said at least one event has occurred.

24. The method according to claim 1, wherein the specific event is a change to a resource.

25. The method according to claim 1, further comprising storing details of the specific event in the hub.

26. The computer-readable medium of claim 10, wherein the specific event is a change to a resource.

27. The computer-readable medium of claim 10, wherein said computer is further instructed to store details of the specific event.

28. The real time messaging framework hub according to claim 19, wherein the specific event is a change to a resource.

29. The real time messaging framework hub according to claim 19, wherein the processor is further configured to store details of the specific event in the hub.

* * * * *